(12) United States Patent
Ostermann

(10) Patent No.: US 11,761,324 B2
(45) Date of Patent: Sep. 19, 2023

(54) SOLID-STATE DAMPING OF MECHANICAL VIBRATION IN TOOL STRING

(71) Applicant: Halliburton Energy Services, Inc., Houston, TX (US)

(72) Inventor: Neil Alan Ostermann, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 35 days.

(21) Appl. No.: 17/458,856

(22) Filed: Aug. 27, 2021

(65) Prior Publication Data

US 2023/0065177 A1     Mar. 2, 2023

(51) Int. Cl.
*E21B 47/017*     (2012.01)
*F16F 9/30*     (2006.01)
*E21B 17/07*     (2006.01)

(52) U.S. Cl.
CPC .......... *E21B 47/017* (2020.05); *E21B 17/07* (2013.01); *F16F 9/30* (2013.01)

(58) Field of Classification Search
CPC . F16F 9/30; G01V 1/523; E21B 17/07; E21B 47/017
See application file for complete search history.

(56) References Cited

U.S. PATENT DOCUMENTS

| | | | |
|---|---|---|---|
| 3,191,141 A * | 6/1965 | Schuster | G01V 1/523 367/27 |
| 5,188,191 A | 2/1993 | Tomek | |
| 5,335,463 A * | 8/1994 | Reinhall | E04B 1/98 52/167.1 |
| 6,082,484 A * | 7/2000 | Molz | G01V 1/523 181/102 |
| 6,588,267 B1 * | 7/2003 | Bradley | G01V 1/523 181/102 |
| 6,643,221 B1 | 11/2003 | Hsu et al. | |
| 8,205,691 B2 | 6/2012 | Bowar et al. | |
| 10,545,255 B2 * | 1/2020 | Nguyen | E21B 47/107 |
| 2004/0168805 A1 * | 9/2004 | Fripp | E21B 43/11 166/297 |
| 2016/0252639 A1 * | 9/2016 | Chang | G01V 1/46 367/25 |

(Continued)

FOREIGN PATENT DOCUMENTS

| | | |
|---|---|---|
| EP | 0900918 | 3/1999 |
| WO | 2015-026372 | 2/2015 |

OTHER PUBLICATIONS

International Search Report and Written Opinion for Application No. PCT/US2021/049504, dated May 17, 2022.

*Primary Examiner* — Theodore N Yao
(74) *Attorney, Agent, or Firm* — John W. Wustenberg; C. Tumey Law Group, PLLC

(57) ABSTRACT

A vibration-damping sub is provided to mitigate shock and other sources of vibration in a tool string. In examples, a tubular damping body is rigidly coupled between a vibration-sensitive tool and a vibration source. The tubular damping body includes a tubular wall defining a plurality of shaped holes configured to dampen the mechanical vibration to below the design threshold for the vibration-sensitive tool. The tubular damping body may also include different portions having different materials and impedances to further disrupt the propagation of mechanical waveforms.

8 Claims, 7 Drawing Sheets

(56) References Cited

U.S. PATENT DOCUMENTS

2018/0334863 A1* 11/2018 Dziekonski ............... E21B 7/24
2020/0088013 A1    3/2020 Grove et al.
2020/0408074 A1* 12/2020 Yang .................... E21B 43/116

* cited by examiner

SOLID-STATE DAMPING OF MECHANICAL VIBRATION IN TOOL STRING

BACKGROUND

A variety of downhole tools are used in the construction, operation, and maintenance of wells used for recovery of hydrocarbons such as oil and gas. Downhole tools are often tripped into a well on a conveyance, such as a tubing string, coiled tubing, wireline, and variants thereof. For example, a bottom hole assembly of a drill string used in drilling a wellbore often includes mechanical and electrical devices used for navigating the wellbore and communicating information about the well to and from the surface. Other tools are then lowered into the well, such as perforating guns that use explosive material to form flow paths through casing lining the wellbore into the formation. Still other tools may be used to log and service the well. Many of these tools include sensitive electronics and precision mechanical componentry.

Reliability of downhole tools is a key design consideration so the tools can maintain their functionality and accuracy throughout their expected service lives. Protecting tools from internal and/or external shock and vibration forces is one aspect of maintain reliability. For example, downhole explosives used in perforating a well produce shock waves across a spectrum of frequencies that are potentially damaging to mechanical and electrical components within the rest of the tool string. Another example where jarring shock and vibration can occur in a tool string is with the use of tractors used across wireline operations.

BRIEF DESCRIPTION OF THE DRAWINGS

These drawings illustrate certain aspects of some of the embodiments of the present disclosure and should not be used to limit or define the disclosure.

DETAILED DESCRIPTION

Figure 1:
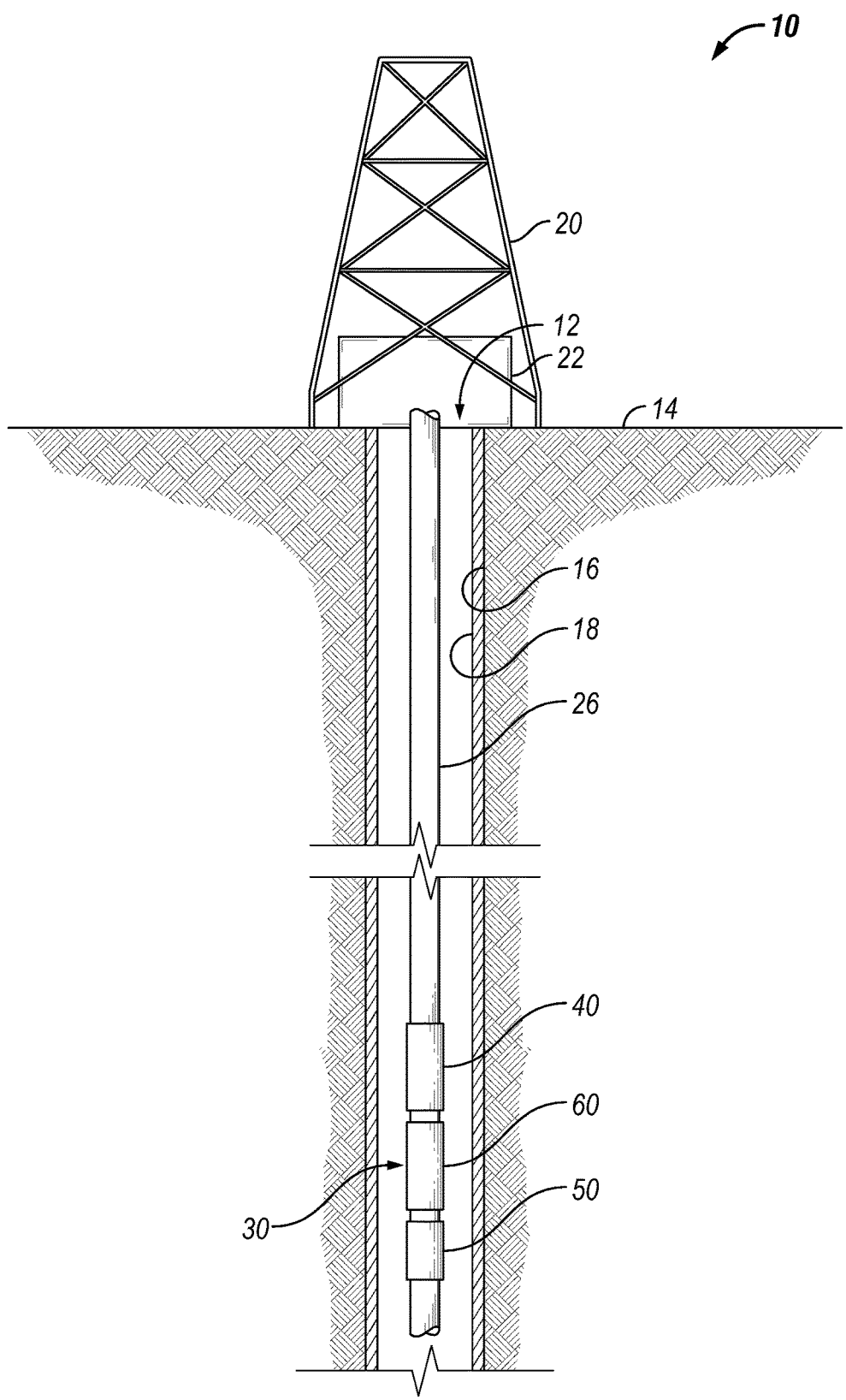
FIG. 1 is an elevation view of a representative well site for mitigating vibration in a tool string suspended from a conveyance.

The present disclosure is generally directed to mitigating vibration in a tool string to protect a vibration-sensitive tool. The disclosed approach focuses on disrupting the mechanical waves produced from a shock or other vibration source, utilizing interference and acoustic impedance differences to reduce the magnitude of that wave. The wave is intentionally redirected to impose a reduction in intensity before the wave reaches a vibration-sensitive tool. This may include using reflection and refraction waves to destructively interfere with the wave, and to extend the distance the wave must travel prior to reaching the vibration-sensitive tool. The vibration mitigation may act in any or all axes of freedom, as further discussed below.

Embodiments of the disclosure include a vibration damping sub coupled between a vibration-generating tool and a vibration-sensitive tool. The sub has a specific pattern of shaped holes formed into the wall of housing to provide at least a portion of the vibration mitigation. The shaped holes may go partially or fully through the wall of a damping sub. The shaped holes are not merely perforations, but may have shapes and/or arrangements specially configured to impede propagation of the mechanical wave. The shaped holes may be formed by any suitable means, such as stamping, cutting, perforating, molding, or additive manufacturing (i.e., 3D printing). The shapes and arrangement of the shaped holes may be determined, in one or more embodiments, from electronic modeling and thus may vary based on the particular application. The shaped holes in at least some embodiments are described as slots, having a relatively long but narrow form factor. The slots in some examples include angled portions that produce incidence angles of reflection and refraction to destructively interfere with waveforms that are produced at one end of the sub in a manner that reduces the magnitude of the waveform before reaching the other end of the sub. In one or more embodiments, the slots or other shaped holes may be asymmetric in terms of shape and/or arrangement of the shaped holes with respect to a longitudinal axis of a tubular damping body. The asymmetric shape and/or arrangement may generate an asymmetric wave response beneficially disrupting propagation of the mechanical waveform as compared with a symmetric shape and/or arrangement.

The vibration-damping sub may also incorporate different materials with acoustic impedance differences to reduce magnitudes of the waveforms. The vibration-damping sub may mitigate vibration without reliance on springs, rubberized materials, or moving parts, which may reduce complexity and increase reliability. In one or more embodiments, a plurality of contiguous tubular portions of different mechanical impedances may disrupt the mechanical wave. In one or more embodiments, the plurality of contiguous tubular portions of different mechanical impedances may sufficiently disrupt the mechanical wave without any shaped holes. In one or more other embodiments, the plurality of contiguous tubular portions of different mechanical impedances may be combined with shaped holes to further disrupt the mechanical wave as compared with using shaped holes or different material impedances alone.

In one or more embodiments, inner surfaces of the slots or other shaped holes may be smooth, e.g., without any appreciable protrusions extending from an inner surface of the shaped holes. By shaping and arranging the shaped holes as disclosed herein, shaped holes with smooth interior surfaces may sufficiently attenuate the mechanical wave without the added structural complexity of a non-smooth inner surface of the shaped holes. This aspect may desirably reduce manufacturing costs and simplify design.

The disclosed principles are particularly useful in mitigating mechanical shock that certain tools, such as perforating guns, can generate. The disclosed principles are also useful in mitigating other sources of vibration that may be coupled to the tool string. The vibration source may be another part of the tool string itself (e.g., another tool) or some external source coupled to the tool string via the conveyance.

FIG. 1 is an elevation view of a representative well site 10 for mitigating vibration in a tool string 30 suspended from a conveyance 26. The well site 10 may include an assortment of equipment and systems generally understood in the oil and gas industry for constructing and operating a hydrocarbon recovery well 12, and some features are schematically shown, simplified, or omitted for ease of discussion. A support structure 20, such as a mast or derrick, or a crane in the case of a rigless operation, is erected above the earth's surface 14 over the well 12. A support foundation or platform, such as a rig floor 22, is provided at the base of the support structure 20. Although certain drawing features of FIG. 1 depict a land-based oil and gas rig, the present disclosure is useful with other types of rigs, such as offshore platforms or floating rigs used for subsea wells, and in any other geographical location. In those other types of rigs, the earth's surface 14 may alternatively represent the floor of a seabed, and the rig floor 22 may be on an offshore platform or floating rig over the water above the seabed.

The support structure 20 is well capable of supporting the weight of the tool string 30 suspended from the conveyance 26, and may include equipment generally understood in the art for raising and lowering tubular strings or other conveyance in the well 12. The conveyance 26 is depicted here as a tubing string, which may be assembled at the surface 14 by progressively adding tubing segments end to end to reach a desired depth. Examples of a tubing string include a drill string comprising segments of drill pipe connected end to end, a casing string, a completion string, and other tubing strings. In certain well operations the conveyance 26 may alternatively comprise coiled tubing, wireline, or other conveyance suitable for supporting the particular tool string 30 as it is conveyed into or out of the well 12. In addition to physical support for raising and lowering the tool string 30, the conveyance 26 may provide fluid communication to the tool string 30, such as for certain hydraulic actuating functions, circulation of well fluids, or production of well fluids. The conveyance 26 may also provide electrical connections between the tool string and surface 14, such as for conveying electrical power or communicating information electronically between the tool string 30 and surface equipment.

The tool string 30 is coupled to at least one vibration source, which may be a vibration-generating tool 40 in the tool string 30. The tool string 30 includes at least one vibration-sensitive tool 50. The vibration-generating tool 40 is capable of generating shock or other source of vibration at a magnitude capable of damaging the vibration-sensitive tool 50. A vibration-damping sub 60 according to this disclosure is coupled between the vibration-generating tool 40 and vibration-sensitive tool 50 to protect the vibration-sensitive tool 50 from potentially damaging vibration from the vibration-generating tool 40. The vibration-generating tool 40 may be directly or indirectly coupled to the vibration-damping sub 60, with or without spacing therebetween. For example, the vibration-generating tool 40 may be directly physically coupled to the vibration-damping sub, or the vibration-generating tool 40 may be spaced along a rigid portion (e.g., tubing) of the conveyance 26. Likewise, the vibration-damping sub 60 may be directly or indirectly coupled to the vibration-sensitive tool 50. As further discussed below, the vibration-damping sub 60 may use a plurality of shaped holes and/or material combinations in the wall of the vibration-damping sub 60 specially configured to interfere with propagation of a mechanical wave. The vibration-damping sub 60 may be considered "solid state" in the sense that it may optionally provide damping without the use of any moveable parts (e.g., springs, mechanical dampers, or other reciprocating members) moveably coupled with respect to a housing of the tool.

Figure 2:
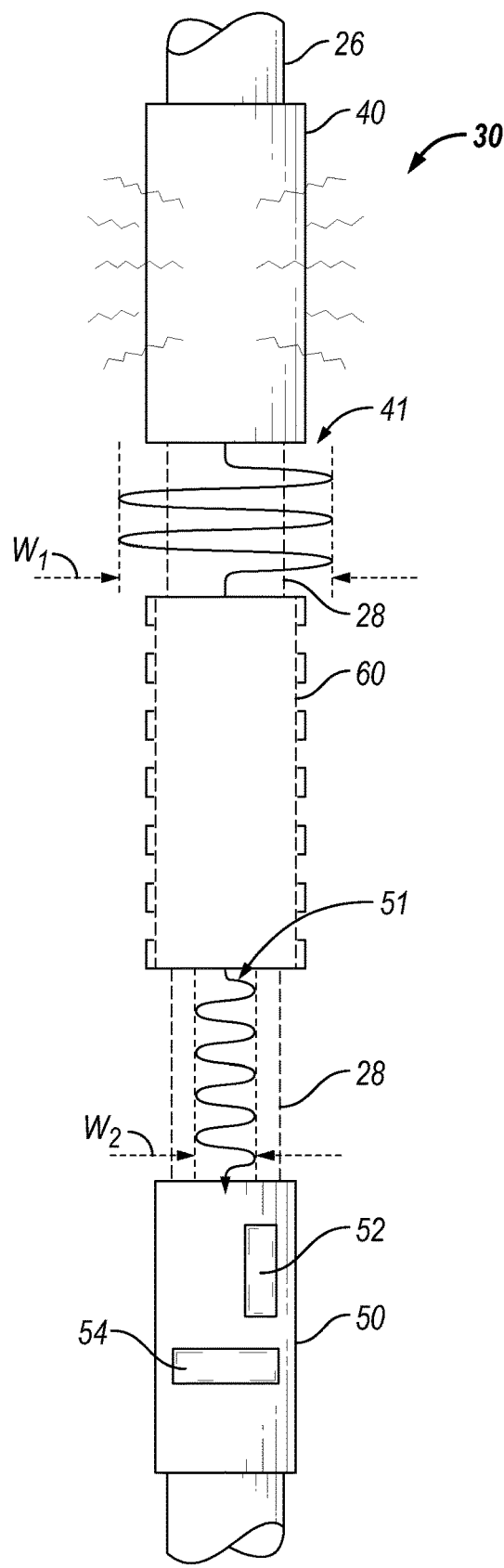
FIG. 2 is a block diagram of the tool string of FIG. 1 further detailing the vibration-generating tool, the vibration-sensitive tool, and the vibration-damping sub.

FIG. 2 is a block diagram of the tool string 30 of FIG. 1. The vibration-generating tool 40 may be any tool capable of generating a mechanical wave 41 of sufficient magnitude and/or frequency to damage the vibration-sensitive tool 50 if unmitigated. One example of a vibration-generating tool discussed below is a perforating gun, which generates a mechanical shock as a result of firing explosive charges. A mechanical shock (which may be referred to herein simply as "shock") is just one possible source of vibration. Shock is a transient physical excitation resulting from a sudden acceleration caused, for example, by an explosion. Shock produces extreme rates of force with respect to time. Shock can be expressed a vector, with units of an acceleration. A shock pulse can be characterized by its peak acceleration, the duration, and the shape of the shock pulse (half sine, triangular, trapezoidal, etc.). Other vibration-generating tools can also produce damaging vibrations, and this disclosure contemplated both vibrations due to shock as well as other sources and types of vibration. The schematically-indicated mechanical wave 41 may have a waveform with one or more quantifiable waveform properties "W1" such as an amplitude, intensity, energy level, or other properties, the magnitude of which may indicate or relate to the potential for damaging other components.

The vibration-sensitive tool 50 may be any tool susceptible to damage from the vibration from the vibration-generating tool 40 if the vibration is unmitigated. For example, the vibration-sensitive tool 50 may include one or more electronic component 52 and/or mechanical component 54 that are susceptible to the mechanical wave from a shock or other sources of vibration Examples of vibration-sensitive mechanical components include motors, hydraulic pumps, and solenoid valves. The vibration-sensitive tool 50 may have an objective (e.g., numerical or quantifiable) design threshold for withstanding shock or other sources of mechanical vibration, above which damage is expected. The design threshold may be expressed in terms of one or more of the same quantifiable waveform properties (e.g., amplitude, intensity, energy level, etc.) used to describe the waveform properties W1 of the vibration-generating tool 40. The vibration-generating tool 40 may be capable of generating a mechanical vibration in excess of that design threshold, if unmitigated.

The vibration damping sub 60 according to this disclosure is coupled between the vibration-generating tool 40 and vibration-sensitive tool 50 to protect the vibration-sensitive tool 50 from damaging vibrations from the vibration-generating tool 40. The vibration-damping sub 60 is configured, as further described below in association with various examples, to dampen the mechanical vibration at the vibration-generating tool 40 to below the design threshold for the vibration-sensitive tool 50 by the time the mechanical vibration or waveform components thereof reach the vibration-sensitive tool 50. In particular, the vibration-damping sub 60 may utilize reflection and/or refraction to destructively interfere with mechanical waves attempting to propagate along the vibration-damping sub 60 and/or to extend the distance the mechanical wave must travel through the vibration-sensitive sub 60 prior to reaching the vibration-sensitive tool 50. The result of this attenuation is a reduced-intensity (i.e., attenuated) mechanical waveform 51 with waveform properties "W2" that propagates from the vibration-damping sub 60 to the vibration-sensitive tool 50. The attenuated properties W2 of the attenuated mechanical waveform 51 are now below the design threshold for the vibration-sensitive tool 50, thereby protecting the vibration-sensitive tool 50 from damage due to the original mechanical waveform 41 generated by shock or other vibration-producing event.

The vibration-generating tool 40, vibration-sensitive tool 50, and vibration-damping sub 60 are shown closely spaced in FIG. 2, but may be at any given spacing along the tool string 30 in which the vibration-generating tool 40 could potentially transmit damaging mechanical waves to the vibration-sensitive tool 50 without the vibration-damping sub. The vibration-generating tool 40 may be directly or otherwise rigidly coupled to the vibration-damping sub 60, such that the mechanical waveform 41 propagates from the vibration-generating tool 40 to the vibration-damping sub 60. The vibration-damping sub 60 may be directly or otherwise rigidly coupled to the vibration-sensitive tool 50, such that the attenuated mechanical waveform 51 propagates from the vibration-damping sub 60 to the vibration-sensitive tool 50. This propagation of mechanical waves may occur when there is some sort of rigid coupling 28 between these components, even if the components are not directly coupled to each other. For example, where the vibration-generating tool 40, vibration-damping sub 60, and vibration-sensitive tool 50 are spaced apart along a rigid tubular conveyance 26, the conveyance itself may act as the rigid coupling 28 allowing the mechanical wave to propagate between these components of the tool string 30. Propagation of a mechanical wave may also occur where the rigid coupling 28 is present between the vibration-generating tool 40, vibration-damping sub, and vibration-sensitive tool 50, even if the conveyance 26 extending above the tool string 30 is not rigid. For example, perforating guns can be conveyed in some cases on rigid tubing, and other times on a flexible wireline. Even when supported by a relatively flexible wireline, a perforating gun could damage other components that are rigidly coupled to the perforating gun. Furthermore, it generally does not matter whether the vibration-generating tool 40 is above, below, or otherwise arranged with respect to the vibration-sensitive tool 50 so long as the vibration-damping sub 60 is coupled therebetween. For example, in the tool string 30, the vibration-generating tool 40 is sometimes above the vibration-sensitive tool 50 and other times below the vibration-sensitive tool 50.

Figure 3:
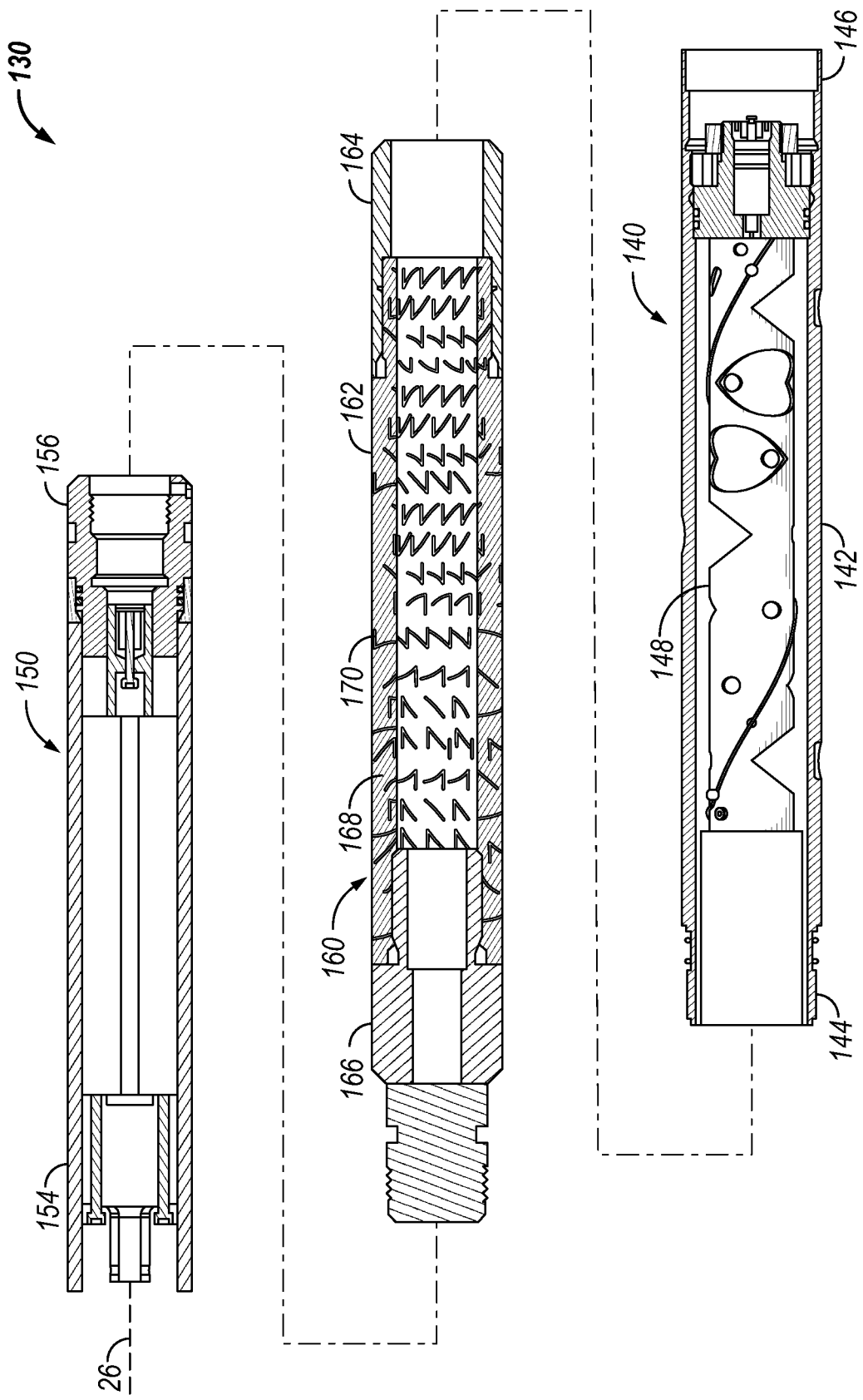
FIG. 3 is a cross-sectional view of one example configuration of a tool string wherein the vibration-sensitive tool comprises a perforating gun and the vibration-sensitive tool comprises a vibration-sensitive electronic tool.

FIG. 3 is a cross-sectional view of one example configuration of a tool string 130 wherein the vibration-generating tool comprises a perforating ("perf") gun 140 and the vibration-sensitive tool comprises an electronic tool 150. The electronic tool 150 is embodied here, by way of example, as a downhole tension tool, but could alternatively be any of a variety of electronic tools with sensitive electronic components (e.g., sensors, processors, controllers, circuit boards, and the like). The perf gun 140 includes a rigid, outer gun body 142 to house and protect the internal components ("internals") of the perf gun 140. A structural charge holder 148 inside the gun body 142 is configured to hold shaped charges (not shown) in selected firing orientations, which may be radially outwardly and at different azimuthal directions with respect to one another. The shaped charges are configured, when detonated, to focus the effect of their explosive energy in a particular direction. The gun body 142 may include a first (e.g., downhole) connector 146 for coupling to other tool string components, such as another perforating gun (not shown). The gun body 142 may include a second (e.g., uphole) connector 144 for coupling to a downhole connector 166 of the damping sub 160. The damping sub 160 may also include an uphole connector 164 for coupling to a downhole connector 156 of the vibration-sensitive tool 150. The vibration-sensitive tool 150 may include an uphole connector 154 for coupling to another tool string component or to the conveyance 26.

The various example connectors provide physical (e.g., rigid mechanical) coupling between the vibration-generating tool (e.g., perf gun 140), the vibration-damping sub 160, and the vibration-sensitive tool 150. The connectors may also establish electrical connections or pass-through electrical connectivity between the various components of the tool string 130. For example, the electronic tool 150 may have an electrical connection that passes through the vibration-damping sub 160 to the perf gun 140 for providing electrical power and/or signal communication to selectively fire the perf gun 140. When an electronic firing signal is sent to the perf gun 140, the shaped charges are detonated, resulting in a shock pulse generating a mechanical wave that may be delivered in both an uphole and downhole directions from the perf gun 140.

The mechanical wave generated by the perf gun 140 is generally constrained to propagate through the vibration-damping sub 160 in order to reach the electronic tool 150 since the vibration-damping sub 160 is rigidly coupled between the perf gun 140 and the electronic tool 150. Losses due to the surrounding fluid will generally be negligible in comparison to the magnitude of the mechanical wave that travels along the vibration-damping sub 160. The vibration-damping sub 160 includes a tubular damping body 162 configured to dampen the vibrations by destructively interfering with the mechanical wave. In particular, the vibration-damping sub 160 in this embodiment has a plurality of axially and circumferentially arranged shaped holes formed through a wall 168 of the tubular damping body. The shaped holes are a specific pattern (arrangement and shape) of slots 170 specifically formed in the tubular damping body 162 (the shaped holes are not to be confused with the perforations formed in a wellbore casing by firing per charges). The slots 170 pass all the way through a wall 168 of the sub, but may alternatively be formed to pass only partially through the wall 168. A mechanical wave imparted at one end of the vibration-damping sub 160 is constrained to pass almost entirely along its tubular wall 168.

The arrangement and shapes of slots 170 in the tubular wall 168 provide interference to impede the mechanical wave from propagating along the tubular wall 168. The particular arrangement of shaped holes and their shape may affect the mechanical wave by directing or redirecting the mechanical wave intentionally into certain directions to reduce the magnitude of the wave at one end (e.g., at the downhole connector 166) before reaching the other side of the sub (e.g, the uphole connector 164). This may include using reflection and/or refraction waves to destructively interfere with other waves throughout the vibration-damping sub, and to extend the distance the wave must travel through the vibration-damping sub 160 prior to reaching the other side of the vibration-damping sub. This may occur without any moving parts (e.g., no springs or reciprocating dampers) coupled to the tubular damping body 162.

Figure 4:
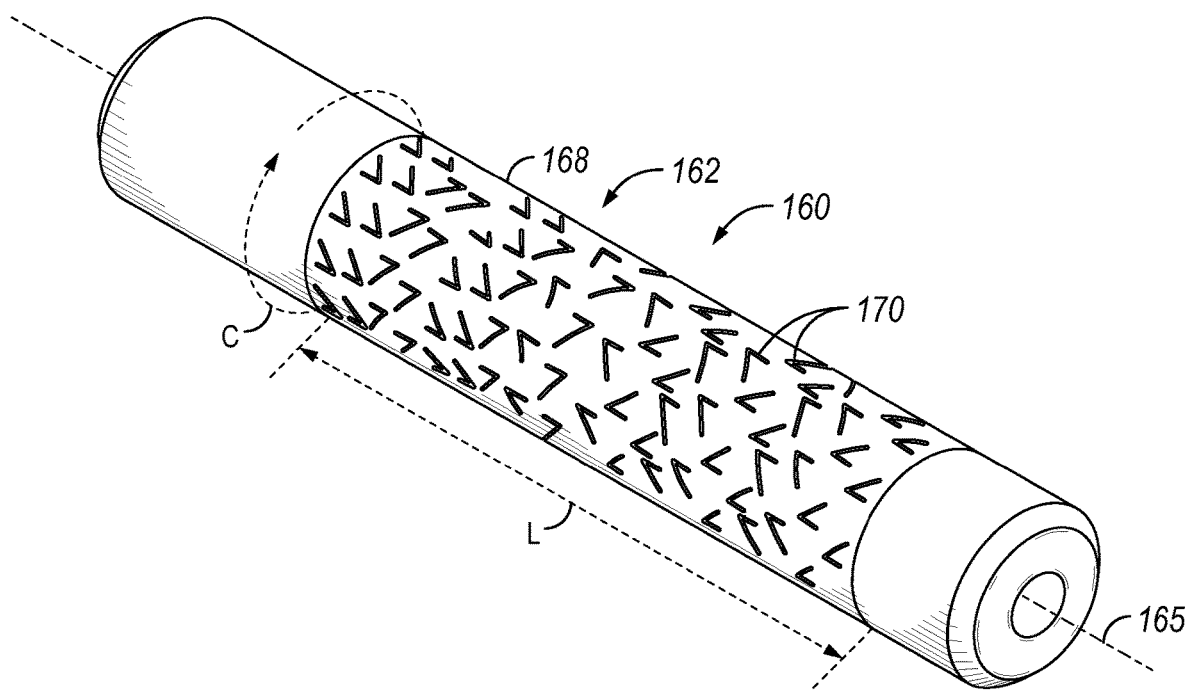
FIG. 4 is another, perspective view of the vibration-damping sub of FIG. 3.

FIG. 4 is another, perspective view of the vibration-damping sub 160 of FIG. 3. In this example the vibration-damping sub 160 including the damping body 162 are generally tubular with a circular cross-section. However, the shape is not limited to having a circular tube form. The vibration-damping sub 160 has a length "L" along a longitudinal axis 165 and a circumference "C" about the longitudinal axis 165. The slots 170 are generally radially formed through the tubular wall 168.

Figure 5:
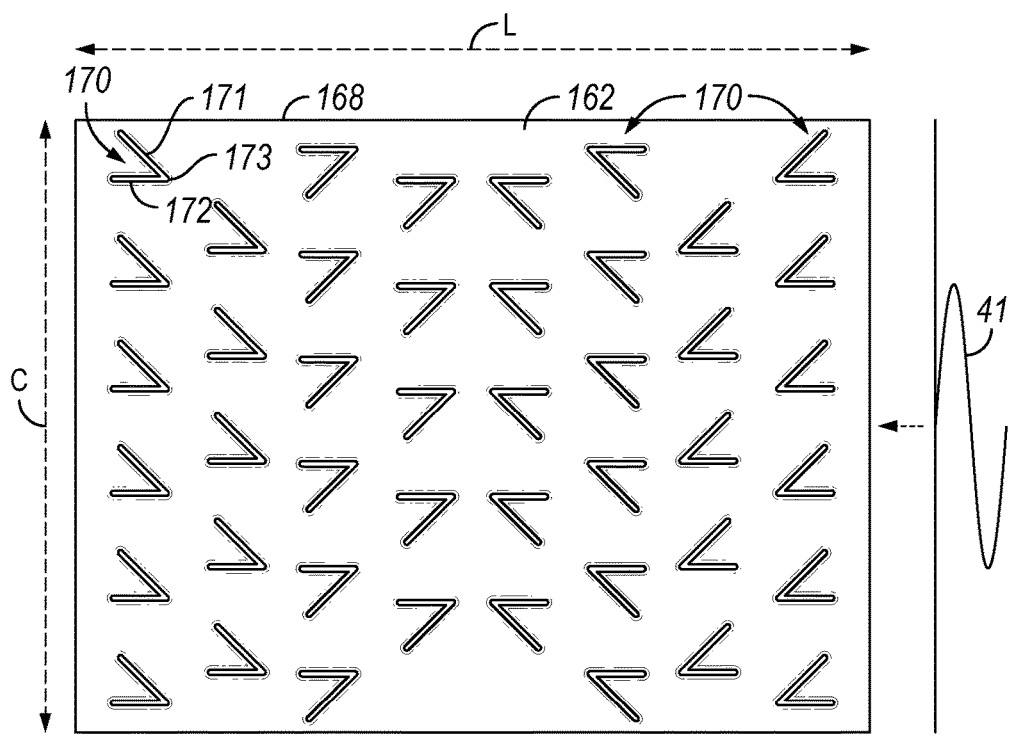
FIG. 5 is a flat pattern of the tubular damping body of FIGS. 3 and 4, further detailing the example pattern of slots.

FIG. 5 is a flat pattern of the tubular damping body 162 of FIGS. 3 and 4, further detailing the example arrangement of slots 170. The flat pattern illustrates the tubular damping body 162 as though it were unrolled and laid out flat, with the length "L" and circumference "C" of the tubular wall 168 labeled for reference. The slots 170 are arranged both longitudinally (i.e., along the length L of the tubular damping body 162) and circumferentially (i.e., along the circumference C of the tubular damping body 162). Each slot 170 comprises a first leg 171 and a second leg 172. The second leg 172 forms a vertex 173 with the first leg 171 at an acute angle therebetween. The first leg 171 is angled with respect to a longitudinal axis of the damping body. The second leg 172 is at an acute angle with respect to the first leg 171. The second leg 172 is also parallel with the longitudinal axis of the tubular damping body in this example. As the mechanical wave 41 generated by the vibration-generating tool 40 propagates along the wall 168, it is disrupted by the slots 170.

Figure 6:
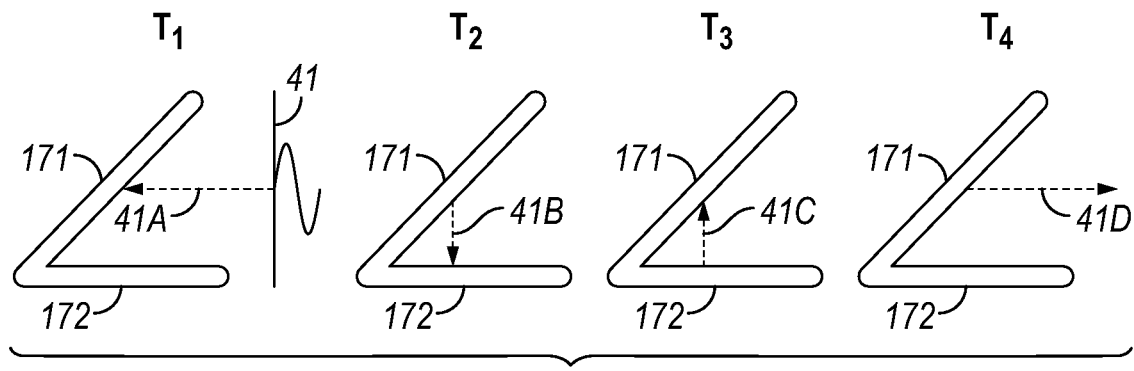
FIG. 6 is a diagram illustrating a sequence of a local mechanical wave disruption in the slot pattern of FIG. 5.

FIG. 6 is a diagram illustrating a sequence of a local mechanical wave disruption in the slot pattern of FIG. 5. At a first instant in time T1, a wave component 41A may be propagating longitudinally through the tubular wall toward a vibration-sensitive tool when a first wave component 41A impinges the first leg 171 of the slot 170. At another instant T2, the first wave component 41A reflects off the first leg 171 as a second, lateral wave component 41B. At another instant T3, the second wave component 41B is reflected off the second leg 172 back toward the first leg 171 as a third wave component 41C. The third wave component 41C is reflected off the first leg 171 at instant T4 as a fourth wave component 41D. The fourth wave component 41D is a longitudinal wave component in the opposite the direction of the first wave component 41A. In this manner, a portion of the wave 41 will be directed back toward the vibration-generating components or at least away from the vibration-sensitive component at each slot 170. This wave component behavior may be repeated at each one of the angular slots 170, thus applying an aggregate disruptive effect to the mechanical wave 41 in total. The pattern of slots 170 cause the wave to be reflected in different directions and extends the distance components of the wave must travel to get from one side of the damping sub to the other.

Figure 7:
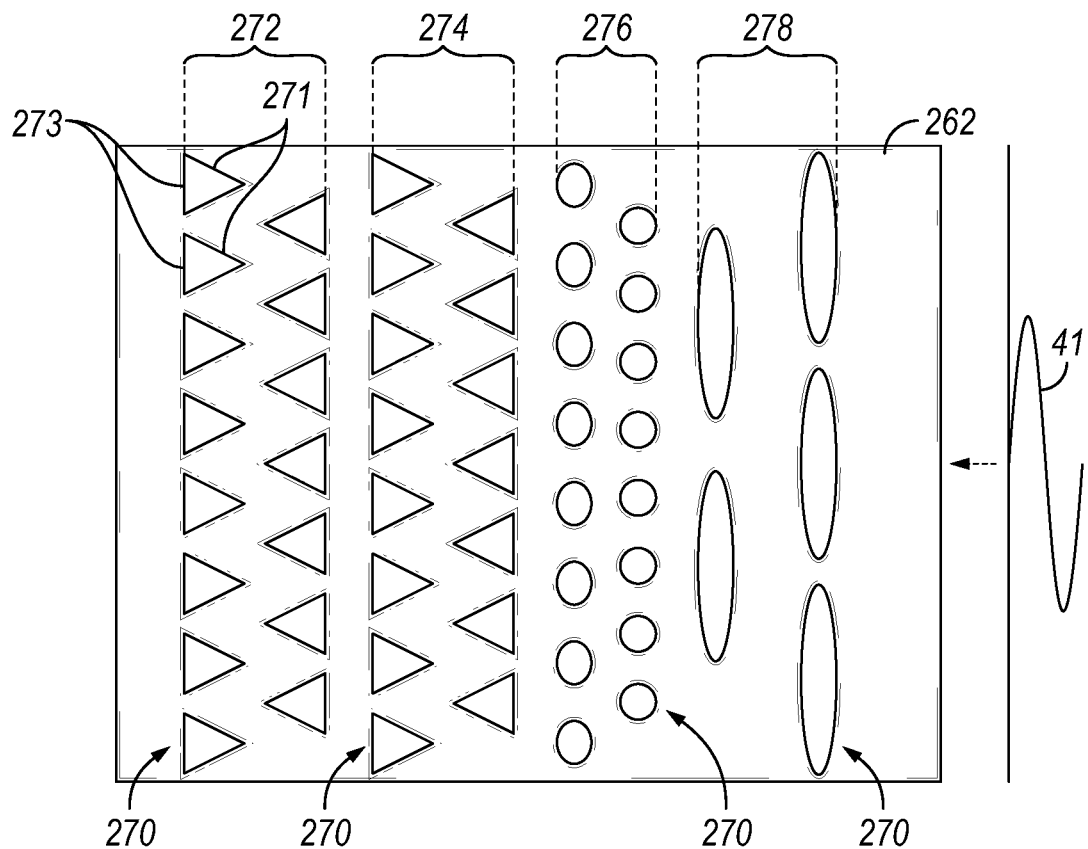
FIG. 7 is a flat pattern for a tubular damping body with another example pattern of shaped holes arranged in groupings of different shapes and sizes.

FIG. 7 is a flat pattern for a tubular damping body 262 conceptually illustrating an example of shaped holes 270 arranged in groupings of different shapes and sizes. This example uses a particular example arrangement of regular geometrical shapes, such as circles, ovals, and polygons, to illustrate shape differentiation, and not to suggest that such shapes necessarily be included in any given embodiment. In at least some embodiments, different shapes of shaped hole could be devised that do not conform to a regular geometrical shape. In this example arrangement, there are four groupings 272, 274, 276, 278 longitudinally spaced from each other. Each grouping 272, 274, 276, 278 includes multiple shaped holes circumferentially spaced from each other. In this example, the groupings each include two longitudinally spaced rows of their respective shapes, wherein the shaped holes within each row are circumferentially spaced from each other. A first grouping 272 of shaped holes have a first shape (triangular) and a first size. Each triangular shaped hole in grouping 272 includes at least one leg 271 at an acute angle to a longitudinal axis of the tubular damping body, and a second leg 273 perpendicular to the longitudinal axis, which in that aspect is comparable to the angled shaped holes of FIG. 5. A second grouping 274 of shaped holes axially spaced from the first grouping of shaped holes have the same shape (triangular) and size as the first grouping. A third grouping 276 of shaped holes longitudinally spaced from the second grouping 274 has a different shape (circular) and size (smaller) than the first and second groupings 272, 274. A fourth grouping 278 of shaped holes has a different shape (ovular) and size (wider circumferentially) than the first three groupings 272, 274, 276. The mechanical wave 41 may be successively disrupted in attempting to propagate (right to left) beyond each grouping. The wave 41 may also be disrupted differently by each grouping of shapes due to the different shapes and sizes of the successive groupings.

Figure 8:
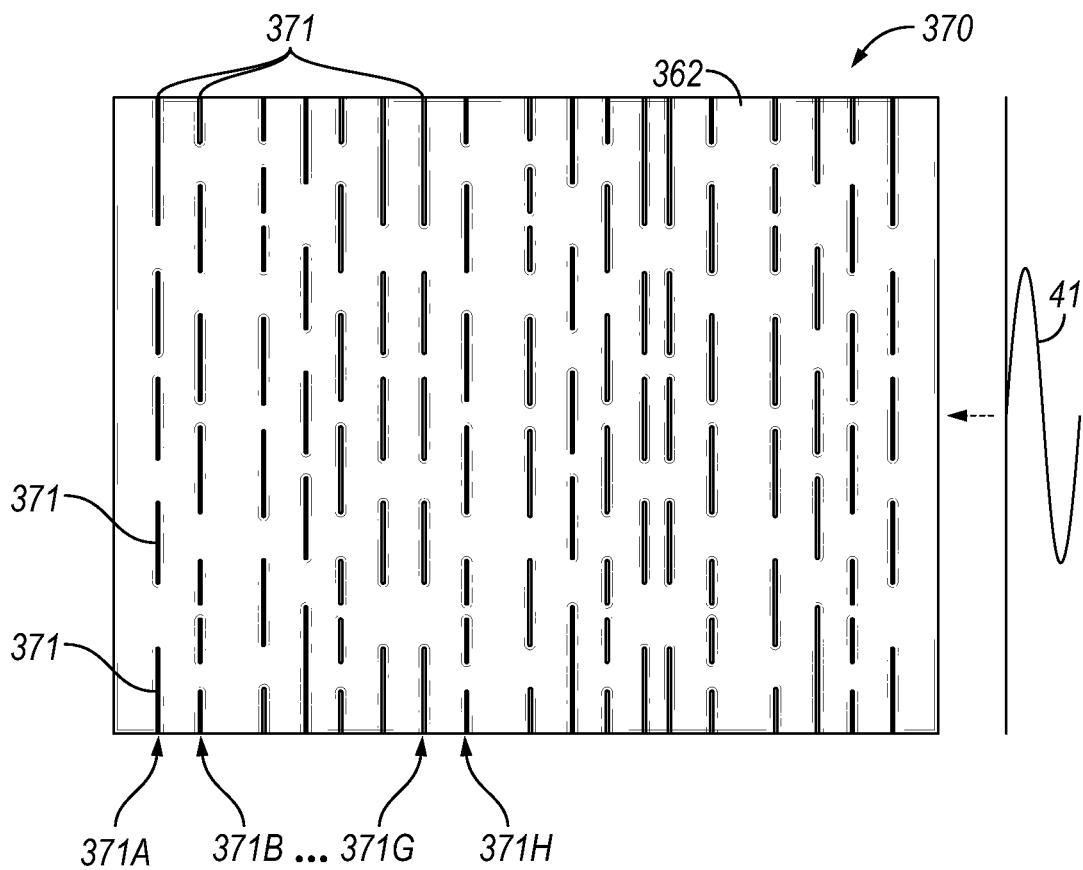
FIG. 8 is a flat pattern for a tubular damping body with another example pattern of shaped holes comprising rows of narrow, circumferentially-extending slots.

FIG. 8 is a flat pattern for a tubular damping body 362 with another example arrangement of shaped holes 370 comprising rows of narrow, circumferentially-extending slots 371. The rows are longitudinally spaced along the tubular damping body 362. The lengths and spacing of the slots 371 in any given row may vary with respect to each other. The widths, lengths, and spacing of slots 371 in any given row may also vary from the widths, length, and spacing of slots 371 in other rows. Certain example rows are labeled for discussion as 371A, 371B, 371G, and 371H. In row 371A the slots are all the same width in a longitudinal direction along the tubular damping body and of different (e.g., random) lengths and spacings in a circumferential direction on the tubular damping body. The slots in row 371B all have the same width as the slots in row 371A but are of different lengths and spacings as the slots in row 371A. The slots in row 371B are also staggered from the slots in row 371A. The slots in rows 371G and 371H are wider than the slots in rows 371A and 371B. The slots in rows 371 are also of different lengths and spacings and are staggered with respect to the slots in row 371H. The different slot lengths, widths, and the staggering between adjacent rows of the slots 370 help disrupt the mechanical wave 41 as it attempts to propagate along the tubular damping body.

Figure 9:
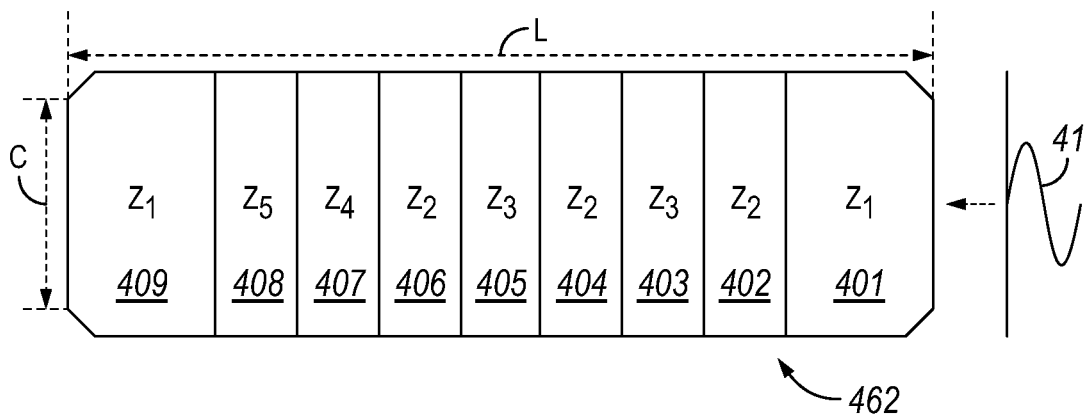
FIG. 9 is a flat pattern of a damping body with another example configuration that uses a plurality of contiguous tubular portions of different mechanical impedances $Z1$-$Z5$ to disrupt the mechanical wave.

FIG. 9 is a flat pattern of a damping body 462 with another example configuration that uses a plurality of contiguous tubular portions 401-409 of different mechanical impedances Z1-Z5 to disrupt the mechanical wave 41. The different tubular portions are circumferentially extending, and are longitudinally arranged with respect to each other along the damping body 462. Every pair of adjacent tubular portions has a different impedance. For example, adjacent tubular portions 401 and 402 have respective impedances Z1 and Z2, and adjacent tubular portions 406 and 407 have respective impedances Z2 and Z4. Some of the materials can be reused at different locations along the tubular damping body to provide different combinations of impedances from a finite set of material and impedance options. For example, tubular portions 401 and 409 at opposite ends have the same mechanical impedance Z1 while other tubular portions vary from Z2 to Z5 therebetween. The variation of mechanical impedances may be ordered or randomized.

Figure 10:
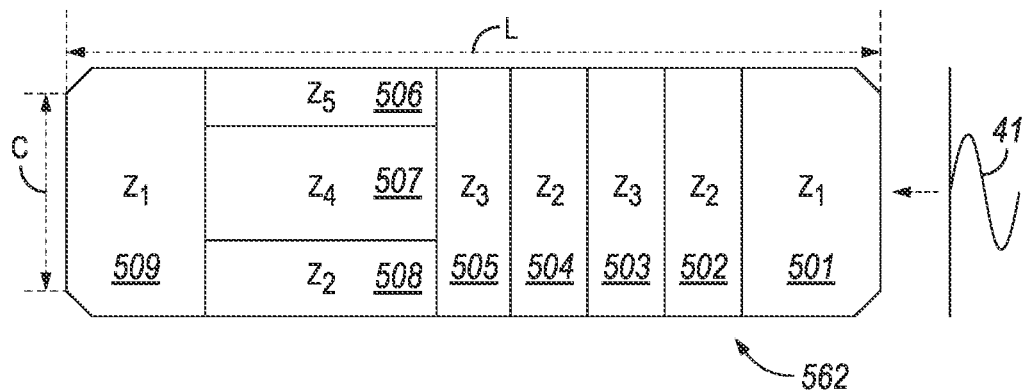
FIG. 10 is a flat pattern of a damping body according to another example configuration that uses a plurality of tubular portions longitudinally arranged with respect to each other, in combination with a plurality of other portions circumferentially-arranged with respect to each other.

FIG. 10 is a flat pattern of a damping body 562 according to another example configuration that uses a plurality of tubular portions 501-505 and 509 longitudinally arranged with respect to each other, in combination with a plurality of other portions 506-508 circumferentially-arranged with respect to each other. The tubular portions 501-505, 509, and 506-508 are of various mechanical impedances, to disrupt the mechanical wave 41. Other configurations are within the scope of this disclosure including a combination of two or more axially-arranged tubular portions with two or more circumferentially arranged portions.

In either example of FIG. 9 and FIG. 10, the difference in acoustic impedance of adjacent materials may result in both a reflected wave and a refracted wave as generally understood apart from the specific teachings of this disclosure. Thus, by including several different materials of different impedances, the mechanical wave 41 may be significantly disrupted as it traverses from one tubular portion to the next.

Figure 11:
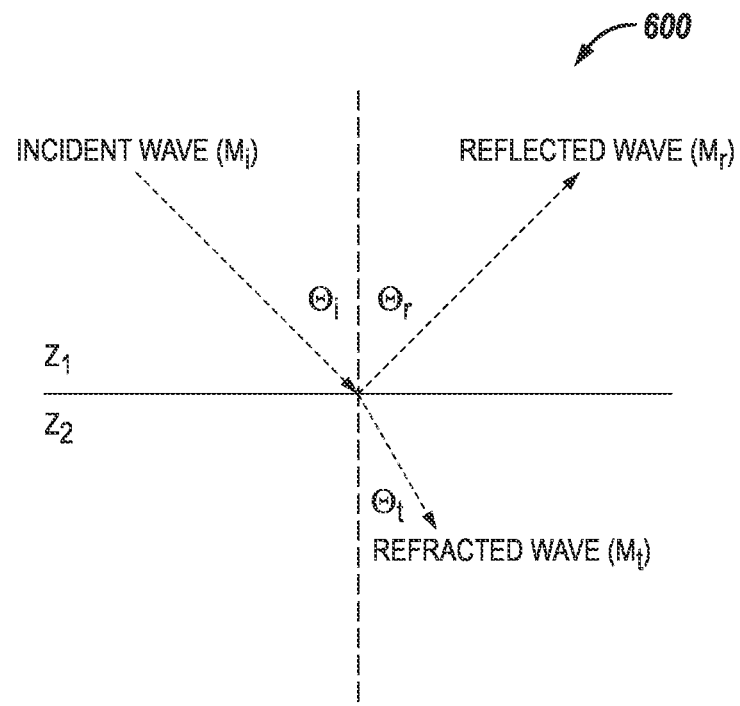
FIG. 11 is a Cartesian coordinate system for describing the physics of acoustics through any two of the adjacent materials of different impedances.

The physics of shock and vibration may be described for a given reference frame. For example, FIG. 11 is a Cartesian coordinate system 600 for describing the physics of acoustics through any two of the adjacent materials of different impedances. Where $Z_1$ is the Acoustic Impedance of the initial medium. $Z_2$ is the Acoustic Impedance of the secondary medium. $M_i$ is the Magnitude of the incident wave. $M_r$ is the Magnitude of the reflected wave. $M_t$ is the Magnitude of the refracted wave. $\Theta_i$=Angle of Incidence. $\Theta_r$=Angle of Reflection. $\Theta_i=\Theta_r$. $\Theta_t=\sin-1(Z_2*(\sin(\Theta_i)/Z_1)$. $M_t=M_i*2*(Z_2)/(Z_2+Z_1)$. $M_r=M_i*(Z_2-Z_1)/(Z_2+Z_1)$. It can be seen that, for adjacent materials of different impedances, there will generally be some reflection and refraction dependent on the impedance difference between the adjacent materials. By providing numerous materials of different impedances, this reflection and refraction is compounded as a mechanical wave attempts to propagate through a tubular damping body according to any of the disclosed embodiments. For example, this may describe the wave behavior at an interface between two contiguous, solid tubing portions of a damping body have different impedances (e.g., FIGS. 9 and 10) or at the interface between a solid damping body and a slot occupied by a fluid (e.g., an air or liquid) in any of the perforated/slotted embodiments.

Although not expressly shown, a selected pattern of shaped holes (e.g., any of FIGS. 5-8) may be combined with a selected arrangement of tubular portions of different impedances (e.g., FIG. 9 or 10), to provide further disruption to the mechanical wave 41.

For simplicity, examples have been discussed in terms of a flat pattern and a Cartesian reference frame. It should be recognized, however, that these principles of using destructive interference may be applied in any or all axes of freedom of a Cartesian coordinate system (X, Y, Z) or other reference coordinate system (e.g., polar or cylindrical coordinates). The dynamics of such a system may include, for example, changes in radius, twist, bending, and all 6 axes of freedom.

This disclosure presents a finite set of example embodiments of different patterns of slots/shaped holes and/or different material impedances. It should be recognized, however, that a myriad of other patterns of shaped holes and/or arrangement of materials with different impedances may be devised within the scope of this disclosure for mitigating vibration in a downhole tool string. A specific configuration may be custom-developed for specific applications, such as through various computer modeling and design simulations. A design method according to this disclosure may include either iterative modeling or the application of machine-learning models to identify the optimal configuration for a damping sub for a given application. The disclosed embodiments may include any of the various features disclosed herein, including one or more of the following statements.

Statement 1. A vibration-damping sub, comprising: a tubular damping body having a tubing wall defining a longitudinal axis and opposing ends for connecting the tubular damping body within a tool string between a vibration source and a vibration-sensitive tool; and a plurality of shaped holes arranged along the tubing wall configured to impede propagation of mechanical waves along the tubular damping body, each shaped hole including an angled portion transverse to the longitudinal axis of the tubular damping body for redirecting the mechanical waves.

Statement 2. The vibration-damping sub of Statement 1, wherein each shaped hole comprises a first leg defining the angled portion of the shaped hole and a second leg forming a vertex with the first leg at an acute angle.

Statement 3. The vibration-damping sub of Statement 1 or 2, wherein the second leg of each shaped hole is parallel with the longitudinal axis of the tubular damping body.

Statement 4. The vibration-damping sub of any of Statements 1 to 3, wherein the plurality of shaped holes comprise a first grouping of shaped holes each having a first shape and a first size and a second grouping of shaped holes axially spaced from the first grouping of shaped holes and having one or both of a second shape different than the first shape and a second size different than the first size.

Statement 5. The vibration-damping sub of any of Statements 1 to 4, wherein the plurality of shaped holes comprise axially spaced rows of circumferentially-extending slots, wherein the circumferentially-extending slots in each row are misaligned with, or at a different spacing than, the circumferentially-extending slots of an adjacent row.

Statement 6. The vibration-damping sub of any of Statements 1 to 5, wherein the tubular damping body further comprises a plurality of contiguous tubular portions formed of different materials having different mechanical impedances.

Statement 7. The vibration-damping sub of Statement 6, wherein the plurality of contiguous tubular portions comprise two or more tubular portions axially arranged with respect to one another or two or more tubular portions circumferentially arranged with respect to one another.

Statement 8. The vibration-damping sub of any of Statements 1 to 7, wherein the plurality of shaped holes comprise smooth inner surfaces.

Statement 9. A tool string, comprising: a conveyance configured for lowering into a wellbore; a vibration-sensitive tool supported on the conveyance; a vibration source coupled to the conveyance capable of generating a mechanical vibration in excess of a design threshold for the vibration-sensitive tool; and a tubular damping body rigidly coupled between the vibration-sensitive tool and the vibration source, the tubular damping body comprising a tubular wall defining a plurality of shaped holes configured to dampen the mechanical vibration to below the design threshold for the vibration-sensitive tool.

Statement 10. The tool string of Statement 9, wherein the vibration source comprises a perforating gun supporting one or more shaped charges for perforating a wall of the wellbore, wherein a detonation of the shaped charges generates the mechanical vibration.

Statement 11. The tool string of Statement 9 or 10, wherein the tubular damping body has no damping components that are directly moveably coupled to the tubular damping body.

Statement 12. The tool string of any of Statements 9 to 11, wherein the shaped holes comprise angled portions transverse to the longitudinal axis of the tubular damping body that impede propagation of the mechanical wave by deflecting them at an angle to a longitudinal axis of the tubular damping body.

Statement 13. The tool string of any of Statements 9 to 12, wherein each shaped hole comprises a first leg defining the angled portion of the shaped hole and a second leg intersecting the first leg at a vertex at an acute angle between the first leg and the second leg.

Statement 14. The tool string of Statement 13, wherein the second leg of each shaped hole is parallel with a longitudinal axis of the tubular damping body.

Statement 15. A method, comprising: lowering a tool string into a well, the tool string including a vibration source and a vibration-sensitive tool; operating the vibration source to generate a mechanical wave in excess of a design threshold for the vibration-sensitive tool; and using a pattern of shaped holes between the vibration source and the vibration-sensitive tool to dampen the mechanical wave to below the design threshold for the vibration-sensitive tool.

Statement 16. The method of Statement 15, wherein using the pattern of shaped holes to dampen the mechanical wave includes using a first angled portion of the shaped holes to reflect the mechanical wave in a first direction transverse to a longitudinal axis of the tubular damping body.

Statement 17. The method of Statement 16, further comprising using a second angled portion of the shaped holes to reflect the mechanical wave from the first angled portion in a second angular direction.

Statement 18. The method of Statement 17, wherein the first angled portion is at an acute angle with the longitudinal axis and the second angled portion is parallel with the longitudinal axis, with the second angular direction being back in an opposite direction at which it was initially propagated Statement 19. The method of any of Statements 15 to 18, further comprising using a plurality of tubing portions of different materials and impedances on the tubular damping body to dampen the mechanical wave.

Statement 20. The method of any of Statements 15 to 19, wherein operating the vibration source to generate a mechanical vibration producing mechanical wave comprises firing a perforating gun.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A vibration-damping sub, comprising:
   a tubular damping body having a tubing wall defining a longitudinal axis and opposing ends for connecting the tubular damping body within a tool string between a vibration source and a vibration-sensitive tool;
   a plurality of shaped holes arranged along the tubing wall configured to impede propagation of mechanical waves along the tubular damping body, each shaped hole including a first leg defining an angled portion transverse to the longitudinal axis of the tubular damping body for redirecting the mechanical waves and a second leg forming a vertex with the first leg at an acute angle; and
   wherein the second leg of each shaped hole is parallel with the longitudinal axis of the tubular damping body.

2. The vibration-damping sub of claim 1, wherein the tubular damping body further comprises a plurality of contiguous tubular portions formed of different materials having different mechanical impedances.

3. The vibration-damping sub of claim 2, wherein the plurality of contiguous tubular portions comprise two or more tubular portions axially arranged with respect to one another or two or more tubular portions circumferentially arranged with respect to one another.

4. The vibration-damping sub of claim 1, wherein the plurality of shaped holes comprise smooth inner surfaces.

5. A tool string, comprising:
   a conveyance configured for lowering into a wellbore;
   a vibration-sensitive tool supported on the conveyance;
   a vibration source coupled to the conveyance capable of generating a mechanical vibration in excess of a design threshold for the vibration-sensitive tool; and
   a tubular damping body rigidly coupled between the vibration-sensitive tool and the vibration source, the tubular damping body comprising a tubular wall defining a plurality of shaped holes configured to dampen the mechanical vibration to below the design threshold for the vibration-sensitive tool, wherein each shaped hole comprises a first leg defining an angled portion of the shaped hole and a second leg parallel with a longitudinal axis of the tubular damping body and intersecting the first leg at a vertex at an acute angle between the first leg and the second leg.

6. The tool string of claim 5, wherein the vibration source comprises a perforating gun supporting one or more shaped charges for perforating a wall of the wellbore, wherein a detonation of the shaped charges generates the mechanical vibration.

7. The tool string of claim 5, wherein the tubular damping body is a solid-state damping body.

8. The tool string of claim 5, wherein the angled portion is transverse to the longitudinal axis of the tubular damping body and impedes propagation of the mechanical wave by deflecting the mechanical wave at an angle to the longitudinal axis of the tubular damping body.

* * * * *